N. J. ROGERS.
HAME FASTENER.
APPLICATION FILED MAY 25, 1910.
982,995.
Patented Jan. 31, 1911.
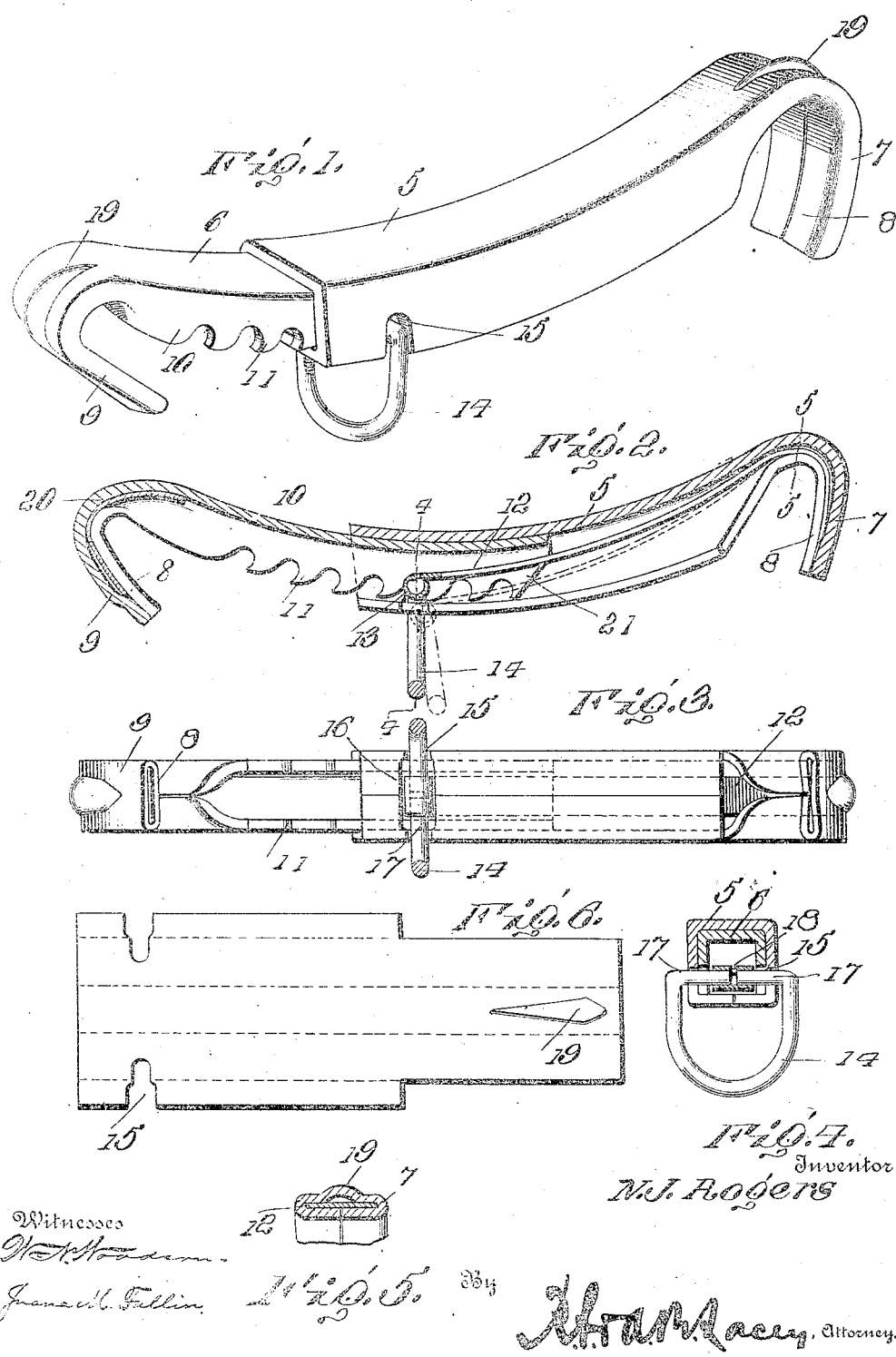

UNITED STATES PATENT OFFICE.

NATHANIEL J. ROGERS, OF TUSCALOOSA, ALABAMA.

HAME-FASTENER.

982,995.

Specification of Letters Patent.

Patented Jan. 31, 1911.

Application filed May 25, 1910. Serial No. 563,394.

*To all whom it may concern:*

Be it known that I, NATHANIEL J. ROGERS, a citizen of the United States, residing at Tuscaloosa, in the county of Tuscaloosa and State of Alabama, have invented certain new and useful Improvements in Hame-Fasteners, of which the following is a specification.

This invention relates to hame fasteners and has for its object the provision of a comparatively simple and thoroughly efficient device of this character, the construction of which is such that the telescopic sections comprising the fastener may be readily assembled and locked in different positions of adjustment.

A further object is to provide one of the telescopic sections with a spring locking member having a terminal finger piece or loop adapted to engage a series of teeth formed on the mating section, said finger piece also serving to release the locking member from engagement with said toothed section when it is desired to separate said sections or adjust one longitudinally relatively to the other.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a hame fastener constructed in accordance with my invention; Fig. 2 is a longitudinal sectional view of the same, showing in full lines the finger loop in contact with the toothed section and in dotted lines said finger loop released from the teeth to permit adjustment of one section relative to the other; Fig. 3 is a bottom plan view; Fig. 4 is a transverse sectional view taken on the line 4—4 of Fig. 2; Fig. 5 is a transverse sectional view taken on the line 5—5 of Fig. 2; Fig. 6 is a plan view of the blank forming one of the telescopic sections.

Corresponding and like parts are referred to in the following description and indicated in all the views of the drawings by the same reference characters.

The improved hame fastener forming the subject matter of the present invention comprises telescopic sections 5 and 6, the section 5 being substantially rectangular in cross section and stamped or otherwise formed from a single piece of metal. The metal constituting one end of the section 5 is bent downwardly and inwardly to produce an attaching hook 7 for engagement with a hame, the metal constituting the longitudinal edges of the hook being bent inwardly to form flanges 8. The section 6 is also preferably stamped or otherwise formed from a single piece of metal and provided with an attaching member or hook 9, similar in construction to the hook 7. The section 6 is provided with spaced flanges 10, the lower edges of which are formed with a series of teeth 11 for engagement with a locking member 12. The locking member 12 is preferably in the form of a flat spring, one end of which is interposed between the flanges 8 and rigidly secured to the section 5 by pressing the metal constituting the flanges into engagement therewith, the opposite end of the spring being bent upon itself to form an eye 13 adapted to receive a finger piece 14, preferably in the form of a loop, as shown.

The loop or finger piece 14 is pivotally mounted in the eye 13, while the free end thereof extends through a transverse slot 15 formed in the bottom of the section 5, there being cut-away portions or recesses 16 formed in the metal constituting the section 5 and communicating with the slot 15 to accommodate the eye 13. The loop or finger piece 14 is preferably formed from a single piece of heavy wire, the ends of which are bent inwardly to produce oppositely disposed arms 17 adapted to engage the teeth 11 on the section 6 for the purpose of locking said section in different positions of longitudinal adjustment with respect to the section 5.

The metal constituting the eye 13 is pressed inwardly to form a stop lug 18 which extends between the arms 17 and serves to center said arms within the eye. The metal constituting the attaching members or hooks 7 and 9 is pressed or rolled to produce strengthening ribs 19 which serve to prevent bending of the hooks when subjected to excessive strain.

A reinforcing plate 20 is preferably secured to the section 6 at the hooked end thereof and retained in position on said section by engagement with the adjacent flanges 8.

Attention is here called to the fact that the arms 17, by engagement with the adjacent walls of the slot 15, serve to hold the free end of the locking member or spring 12 in spaced relation to the top of the section 5 so as to permit the ready insertion of the member 6, the flanges of the member 6 being inclined or beveled at 21 so as to depress the arms 17 and thus permit the passage of said section. It will also be noted that the flanges 8 on the section 5 serve to retain the locking member or spring 12 in position without the employment of bolts, rivets or similar fastening devices.

In using the device, the section 6 is inserted in the section 5 and adjusted longitudinally of the latter, the inclined edges of the teeth 11, by engagement with the arms of the finger piece or loop 14, serving to depress the latter to permit the passage of the section 6.

As the notches or recesses formed by the teeth 11, register with the transverse slot 15, the spring 12 will force the arms 17 within said recesses and thus lock the sections in adjusted position. If desired, the fixed end of the locking member or spring 12 may be riveted or otherwise rigidly secured to the section 5, and in some cases the reinforcing plate 20 may be dispensed with, without departing from the spirit of the invention.

Having thus described the invention, what is claimed as new is:

1. A hame fastener including telescopic sections, each having its outer end bent to produce a terminal hook for attachment to a hame, the metal forming the opposite longitudinal edges of the hooks being bent inwardly to produce flanges, spaced teeth formed on one of the sections, a spring carried by the other section and having one end thereof retained in position thereon by engagement with the flanges, and a finger loop carried by the free end of the spring and adapted to engage the teeth on the mating section.

2. A hame fastener including telescopic sections, one of which is provided with teeth and the other with a transverse slot, a spring housed within the slotted section and provided with a terminal eye, and a finger loop journaled in said eye and extended through the slot for engagement with the teeth on the mating section, the metal forming the eye being pressed inwardly to produce a stop lug extending between the adjacent ends of the finger loop and serving to center the loop in said eye.

3. A hame fastener including telescopic sections, each having its outer end provided with means for attachment to a hame, one of said sections being provided with spaced flanges having teeth formed thereon and the other provided with a transverse slot, a spring housed within the slotted section and having its free end bent to produce an eye, and a finger loop formed of a single piece of metal, the ends of which are bent inwardly within the eye to form oppositely disposed arms adapted to engage the teeth on the mating section for locking said sections in different positions of adjustment, the free end of the spring being normally spaced from the upper wall of the slotted section by engagement of the arms with the adjacent walls of the slot.

4. A hame fastener including telescopic sections, each rectangular in cross section and formed of a single piece of metal, the metal forming the opposite ends of the sections being bent to produce terminal hooks for attachment to a hame and provided with reinforcing ribs, and the metal forming the opposite longitudinal edges of the hooks being bent inwardly to produce flanges, one of said sections being provided with a slot and the other with spaced flanges having teeth formed therein, a reinforcing plate secured to the toothed section and held in position thereon by engagement with the adjacent flanges of the hook, a spring housed within the slotted section and having one end thereof interposed between the flanges of the attaching hook on said section, and the top thereof, the free end of the spring being provided with a terminal eye, and a finger loop journaled in the eye and extending within the slot for engagement with the teeth on the mating section for locking said section in different positions of adjustment.

In testimony whereof, I affix my signature in presence of two witnesses.

NATHANIEL J. ROGERS. [L. S.]

Witnesses:
P. S. HAY,
R. WINGFELLOW.